(12) United States Patent
Olson

(10) Patent No.: US 6,592,490 B2
(45) Date of Patent: Jul. 15, 2003

(54) WELL PUMP GEAR BOX HYDRODYNAMIC WASHER

(75) Inventor: David L. Olson, Los Alamitos, CA (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/847,500

(22) Filed: May 2, 2001

(65) Prior Publication Data

US 2002/0164097 A1 Nov. 7, 2002

(51) Int. Cl.$^7$ ............................. F16C 33/10; F16C 3/41; F16D 3/205; F04B 17/00
(52) U.S. Cl. ................... 475/331; 384/123; 384/112; 384/420; 384/121; 475/159
(58) Field of Search ................. 384/121, 123, 384/124, 125, 112, 420, 425, 368; 475/331, 348, 159

(56) References Cited

U.S. PATENT DOCUMENTS

| | | | |
|---|---|---|---|
| 1,485,799 A | 3/1924 | Miner | |
| 2,285,784 A | 6/1942 | Scott | 308/137 |
| 2,615,766 A | 10/1952 | Wallace | 308/163 |
| 2,722,892 A * | 11/1955 | French | 475/331 |
| 3,399,007 A | 8/1968 | Remmers et al. | 308/172 |
| 3,635,535 A | 1/1972 | Schultenkamper | 308/172 |
| 3,677,665 A * | 7/1972 | Corkill | 475/331 |
| 3,966,279 A | 6/1976 | Raimondi | 308/160 |
| 4,208,076 A | 6/1980 | Gray et al. | 308/9 |
| 4,223,960 A | 9/1980 | Reedy et al. | 308/78 |
| 4,277,111 A | 7/1981 | Gray et al. | 308/9 |
| 4,417,860 A * | 11/1983 | Justice | 475/331 |
| 4,726,695 A | 2/1988 | Showalter | 384/121 |
| 4,772,188 A * | 9/1988 | Kimura et al. | 384/123 X |
| 4,854,745 A * | 8/1989 | Kamimura et al. | 384/124 X |
| 5,265,964 A | 11/1993 | Hooper | 384/93 |
| 5,529,398 A | 6/1996 | Bosley | 384/105 |
| 5,573,063 A * | 11/1996 | Morrow | 475/348 X |
| 5,624,344 A * | 4/1997 | Yehl et al. | 475/159 X |
| 5,725,431 A * | 3/1998 | Myers et al. | 384/420 X |
| 5,795,074 A | 8/1998 | Rahman et al. | 384/123 |
| 5,820,271 A * | 10/1998 | Hackett, Jr. | 384/425 |
| 5,830,098 A * | 11/1998 | Kimes | 475/159 |
| 5,836,206 A | 11/1998 | Craft | 74/333 |
| 5,951,169 A | 9/1999 | Oklejas et al. | 384/123 |
| 5,980,114 A | 11/1999 | Oklejas, Jr. | 384/123 |
| 6,080,076 A * | 6/2000 | Kwoka et al. | 475/159 X |
| 6,089,754 A | 7/2000 | Wilkes et al. | 384/122 |
| 6,132,094 A | 10/2000 | Cornelison et al. | 384/121 |
| 6,336,868 B1 * | 1/2002 | Kurecka et al. | 384/425 |

FOREIGN PATENT DOCUMENTS

DE    WO 90/15464    * 12/1990

* cited by examiner

Primary Examiner—David A. Bucci
Assistant Examiner—Colby Hansen
(74) Attorney, Agent, or Firm—Bracewell & Patterson, L.L.P.

(57) ABSTRACT

A hydraulic washer or spacer is used to reduce friction between a planet gear and the planet carrier. The washer has a top side and a bottom side, an inner diameter and an outer diameter. A mating profile extends from the inner diameter to the outer diameter along the bottom side adjacent the planet gear. The top side has a pumping land, pressure pocket, and bearing surface arranged from the inner diameter to the outer diameter respectively. The pumping land extends from the inner diameter outward radially to the pressure pocket. The pressure pocket is recessed relative to the pumping land and extends from the pumping land outward radially to a containment edge. The containment edge is raised relative to the pressure pocket and pumping land. Extending from the containment edge to the outer diameter is a bearing surface that is also raised relative to the pressure pocket and pumping land. As the washer rotates, the surrounding fluid is subject to centrifugal forces. The fluid passes over the pumping land and into the pressure pocket. Once sufficient pressure has developed, the fluid passes over the containment edge to form a hydraulic barrier between the bearing surface and the planet carrier.

15 Claims, 2 Drawing Sheets

Fig. 1
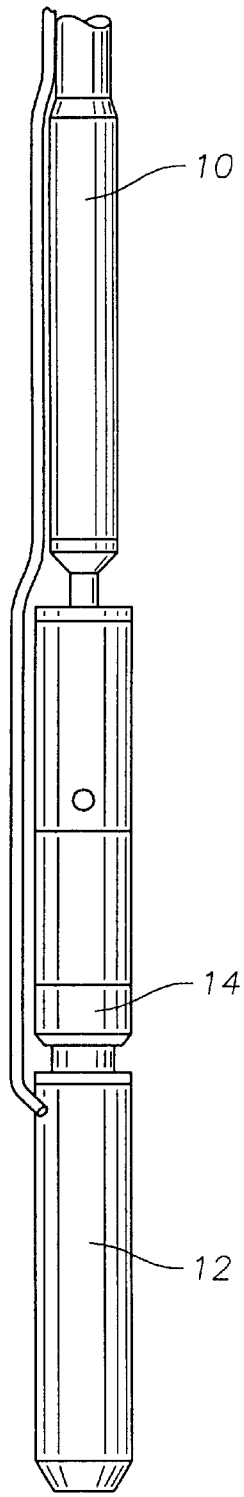
Fig. 4
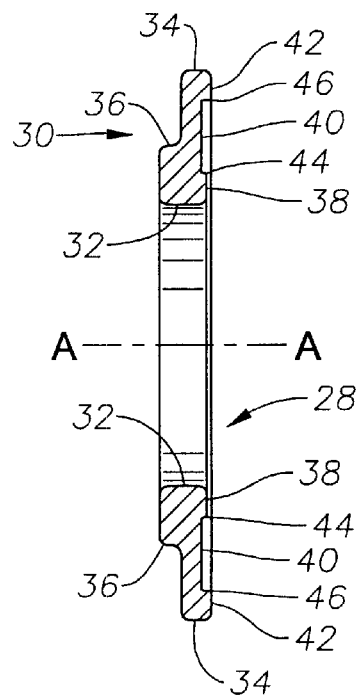
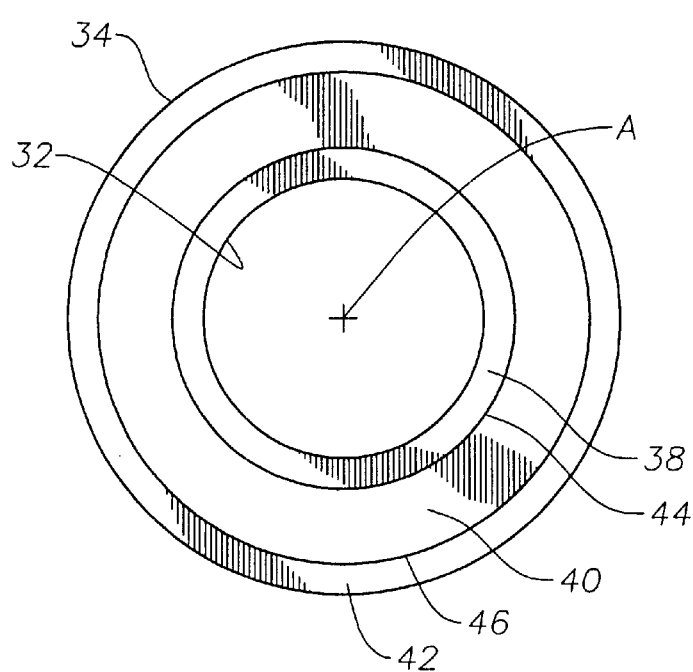
Fig. 5

WELL PUMP GEAR BOX HYDRODYNAMIC WASHER

BACKGROUND OF THE INVENTION

1. Field of the Invention

The present invention relates generally to spacers used to separate rotating parts particularly for a downhole gear box for a well pump. More specifically, the present invention relates to a multidirectional hydrodynamic spacer for use in fluid saturated environments.

2. Description of the Related Art

Spacers are commonly used to separate moving parts in machines. Spacers generally allow for the free movement of the various parts of a machine and tend to wear out due to the friction encountered in this task.

One particular application that uses spacers is a reducing gear in a downhole pump used in hydrocarbon production. Frequently the reducing gears will have spacers between the planet and the planet carrier to provide for free rotation of the planet relative to the carrier and to reduce wear on the planet and carrier. The planet gears in this application rotate in a bath of oil or some other lubricating fluid. The combination of a spacer and the lubricant can extend the life of the planet.

Hydrodynamic spacers are not known in the field because of the relatively high rotational speeds and the unidirectional nature of known hydrodynamic elements. Another field that uses similar technology is thrust bearings, as shown in U.S. Pat. Nos. 5,529,398 and 6,089,754. These bearings are shaped to use the fluid in their environment to separate one part from another. The advantage of this is that under ideal conditions the hydrodynamic bearing completely prevents any contact between the hard surfaces. A film of high pressure fluid is created between the solid surfaces. This greatly reduces wear and heat generation.

While each of the above referenced designs has its advantages, both use a series of ramps or guides aligned in a ring. As the bearing rotates, fluid travels over the ramps or guides and provides increased fluid pressure to maintain a film of oil between the bearing and some other part. Because the bearing is rotating, the ramps or guides are repeated in a ring formation about the bearing so that the fluid flows over one ramp or guide and then on to the next. One of the problems discussed in these patents is the natural migration of fluid to the outer diameter of the rotating bearing. As the bearing rotates at higher speeds centrifugal forces act on the fluid pressing it to the outer edges of the bearings. Another shortcoming of these bearing designs is that they are only efficient in one direction of rotation. When the direction of rotation is reversed the fluid flows over the ramps or guides in reverse and therefore does not build an effective barrier.

It would be advantageous to employ hydrodynamic bearings in a spacer application that operated efficiently in both directions, and was effective at high rotational speeds.

BRIEF SUMMARY OF THE INVENTION

A hydrodynamic spacer or bearing for use in fluid filled environments is effective in either direction of rotation and takes full advantage of centrifugal forces exerted on the fluid. The spacer is comprised of a top side and a bottom side. The bottom side is shaped to mate with a planet or some other rotating element. The top side has a bearing surface, a pressure pocket and a pumping land, all concentrically located between an inner diameter and an outer diameter. The bearing surface extends from the outer diameter radially inward to a sharp containment edge. The pressure pocket is recessed relative to the bearing surface and extends radially inward from the containment edge to a sharp edge. The pumping land extends radially inward from the sharp edge to the inner diameter and is slightly recessed relative to the bearing surface while being elevated relative to the pressure pocket.

In operation the spacer will rotate at relatively high speeds, such that the nearby fluids will experience centrifugal forces. As centrifugal forces push oil from the inner diameter towards the outer diameter, they cross the pumping land and go over the sharp edge into the pressure pocket. Once in the pressure pocket, the fluids are maintained therein by the containment edge until the fluid pressure increases as the fluid passes over the containment edge and therefore over the bearing surface. As the fluid passes over the bearing surface, it is at an elevated pressure, thus separating the spacer from any element in contact with the bearing surface.

BRIEF DESCRIPTION OF THE DRAWINGS

FIG. 1 is a side elevational view illustrating a progressive cavity pump assembly containing a gear box constructed in accordance with this invention.

FIG. 4 is a top view of the spacer in FIG. 2 separate from the planet assembly.

FIG. 5 is a sectional side view of the spacer in FIG. 2 separate from the planet assembly.

DETAILED DESCRIPTION OF THE PREFERRED EMBODIMENT

Figure 2:
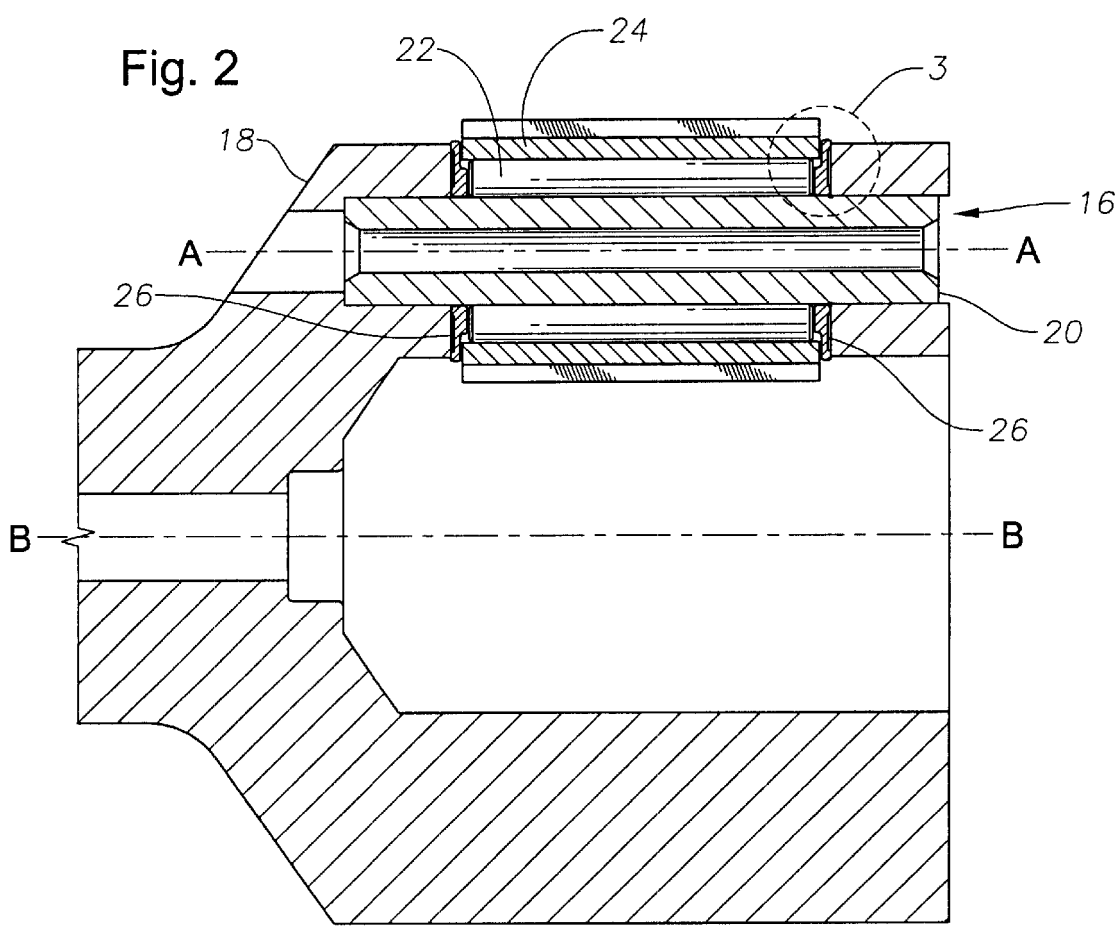
FIG. 2 is a cross sectional view of a planet assembly containing a spacer constructed in accordance with this invention.

Referring to FIG. 1, a progressive cavity pump 10 is connected to a motor 12 by a reducing gear box 14. Gear box 14 utilizes planetary gearing to reduce the output speed of motor 12 to a useful speed for progressive cavity pump 10. Referring to FIG. 2, gear box 14 contains a planet assembly 16 which is comprised of a carrier 18, a pin 20, a needle bearing 22, a gear or planet 24, and a hydrodynamic spacer or washer 26. Carrier 18 supports planet gears 24 that engage a sun gear (not shown) to form a reducing gear. Carrier 18 rotates about an axis B. Carrier 18 supports pin 20, which is a cylindrical member centered on its long axis about an axis A. Axis A is parallel to and offset from axis B. Planet 24 (FIG. 3) is a generally cylindrical member larger than pin 20 which rotates about axis A. Needle bearing 22 separates planet 24 from pin 20. Washers 26 separate planet 24 from carrier 18 at the ends of planet 24. Each washer 26 is concentric about axis A.

As planet 24 rotates about axis A, needle bearing 22 minimizes friction between an outer diameter of pin 20 and an inner diameter of planet 24. Also while planet 24 rotates, washers 26 reduce friction between ends of planet 24 and carrier 18. The combination of needle bearing 22 and washers 26 allow planet 24 to rotate about axis A without wearing the surfaces of carrier 18, pin 20, or planet 24 significantly.

Figure 3:
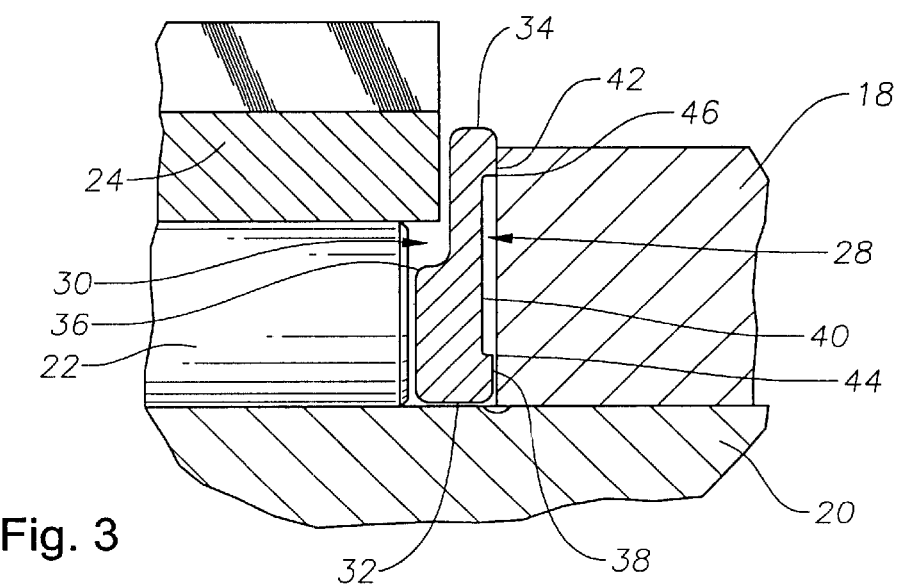
FIG. 3 is an enlarged view as indicated by the circle 3 which appears in FIG. 2.

Turning now to FIG. 3, washer 26 has a top side 28, a bottom side 30, an inner diameter 32 and an outer diameter 34. In the preferred configuration, top side 28 faces carrier 18 while bottom side 30 faces planet 24. Inner diameter 32 is in contact with needle bearings 22. While this is the preferred configuration, washer 28 is quite versatile and may be positioned in a variety of ways with similar results. The terms "top" and "bottom" are used herein for convenience only and not in a limiting sense.

Staying with FIG. 3, bottom side 30 has a mating profile 36 that extends from inner diameter 32 to an outer diameter 34. Mating profile 36 of the preferred embodiment is a step profile that is raised near inner diameter 32 and recessed near outer diameter 34. Mating profile 36 is dependent on the shape of an end of planet 24 and needle bearing 22. In this embodiment the thicker or raised portion of mating profile 36 extends about half the distance between inner diameter 32 and outer diameter 34.

Also in FIG. 3, top side 28 has a pumping land 38, pressure pocket 40, and bearing surface 42, arranged annularly from inner diameter 32 towards outer diameter 34. Pumping land 38 extends from inner diameter 32 to a sharp edge 44, which divides pumping land 38 from pressure pocket 40 in the preferred embodiment. Sharp edge 44 is a 90 degree shoulder. Pressure pocket 40 is slightly recessed relative to pumping land 38 and extends from sharp edge 44 radially outward to a containment edge 46. Containment edge 46 is raised relative to pressure pocket 40 and pumping land 38. Bearing surface 42 extends from containment edge 46 to outer diameter 34 and is also raised relative to pressure pocket 40 and pumping land 38. Referring to FIG. 4 and FIG. 5, pumping land 38, pressure pocket 40, and bearing surface 42 extend all the way around washer 26 continuously in the preferred embodiment. Pumping land 38 is recessed slightly relative to bearing land 42. This is best seen in FIG. 3 where bearing land 42 touches carrier 18, but pumping land 38 does not make contact. This allows fluid to flow into pressure pocket 40 before washer 26 is separated from carrier 18 by the fluid pressure.

Washer 26 operates in a fluid saturated environment. The relatively high rotational speeds experienced by washer 26 in this environment creates a flow of fluid from inner diameter 32 to outer diameter 34. As fluid flows from inner diameter 32 to outer diameter 34 over top side 28, the fluid first passes over pumping land 38 and over sharp edge 44 into pressure pocket 40. In pressure pocket 40, the fluid will be contained by containment edge 46 until sufficient pressure is developed such that the fluid can flow between bearing surface 42 and carrier 18, thus separating bearing surface 42 from carrier 18 and providing a hydrodynamic washer 26.

Because fluid will flow from inner diameter 32 to outer diameter 34 while washer 26 is rotating in either direction, washer 26 is effective in either direction of rotation. Also, the fluid buffers washer 26 from carrier 18 to reduce frictional heat and wear. As can be seen from the drawings, washer 26 may be easily manufactured at a relatively low cost.

While the invention has been shown in only one of its forms, it should be apparent to those skilled in the art that it is not so limited, but is susceptible to various changes without departing from the scope of the invention.

I claim:

1. In a gear assembly having a rotatable planet carrier, a pin having an axis and attached to the planet carrier, a planet gear assembly rotatably mounted on the pin and having a retainer surface that is spaced from a retainer surface of the planet carrier by a gap, and a washer concentrically mounted around the pin in the gap, comprising:

an annular recess on a first side of the washer;
   an annular bearing land on an outer periphery of and protruding axially past the recess for contact with one of the retainer surfaces; and
   a pumping land at an inner periphery of and protruding axially past the recess, the pumping land being axially spaced from said one of the retainer surfaces by a clearance, to enable lubricant surrounding the carrier to flow from an inner diameter of the washer into the recess as the carrier rotates, creating pressure in the recess to move the bearing land away from contact with said one of the retainer surface during rotation of the carrier.

2. The gear assembly according to claim 1, wherein the pumping land is separated from the recess by a cylindrical wall.

3. The gear assembly according to claim 1, wherein the bearing land is separated from the recess by a cylindrical containment wall.

4. The gear assembly according to claim 1, wherein the recess is flat and parallel to said one of the retainer surfaces.

5. The gear assembly according to claim 1, wherein cylindrical walls are located at the inner and outer peripheries of the recess.

6. The gear assembly according to claim 1, wherein said one of the retainer surfaces is located on the bearing carrier.

7. The gear assembly of claim 1, wherein the planet gear assembly comprises a planet gear mounted on a bearing that fits over the pin; and wherein a second side of the washer has an annular inner portion next to an end surface of the bearing and an annular outer portion next to an end surface of the planet gear, the inner and outer portions being located in separate parallel planes.

8. The gear assembly of claim 1, wherein the bearing land and the pumping land are flat surfaces located in parallel planes.

9. A gear assembly comprising:
   a rotatable planet carrier;
   a pin attached to the planet carrier;
   a planet gear assembly rotatably mounted on the pin for rotation about a pin axis, the planet gear assembly having an end surface that is spaced from a retainer surface of the carrier by a gap;
   a washer concentrically mounted around the pin in the gap, the washer having an inner diameter and an outer diameter, a first side and a second side, the second side having a mating profile for mating with the end surface of the planet gear assembly, the first side having a pumping land extending from the inner diameter radially outward to a pressure pocket, the pressure pocket being recessed relative to the pumping land and extending radially outward to a containment wall, and a bearing surface extending radially outward from the containment wall to the outer diameter, the bearing surface being raised in an axial direction relative to the pumping land for contact with the retainer surface; and
   the pumping land being opposed to and spaced from the retainer surface of the carrier by a clearance to enable lubricant surrounding the carrier to flow from the inner diameter of the washer into the pressure pocket as the carrier rotates, creating pressure in the pressure pocket to move the bearing surface away from contact with the retainer surface of the carrier.

10. The gear assembly of claim 9, wherein the planet gear assembly comprises a planet gear mounted on a bearing that fits over the pin; and wherein the second side of the washer has an annular inner portion next to an end surface of the bearing and an annular outer portion next to an end surface of the planet gear, the inner portion being raised relative to the outer portion.

11. The gear assembly of claim 9, wherein a junction of the pumping land with the pressure pocket comprises an annular cylindrical wall that is concentric with the containment wall.

12. The gear assembly of claim 9, wherein the pressure pocket is located in a plane that is parallel to the retainer surface of the carrier.

13. A gear assembly comprising:
   a planet carrier having a carrier axis, the carrier having an axially extending slot;
   a pin extending through the slot of the carrier parallel to and offset from the carrier axis;
   a bearing assembly located on the pin;
   a planet gear mounted on the bearing assembly for rotation on the pin, the planet gear having an axial length less than an axial length of the slot in the carrier, creating gaps on each end of the planet gear;
   a washer concentrically mounted around the pin in each of the gaps, each of the washers having a first side facing an end surface of the slot, the first side having an annular pumping land encircled by a recessed pressure pocket, and an annular bearing land for contact with the end surface of the slot, the bearing land encircling the pressure pocket and separated from the bearing land by a containment wall; and
   the bearing lands of the washers being raised relative to the pumping lands, providing clearances between the pumping lands and the ends of the slots for radial outward flow of lubricant into the pressure pockets.

14. The gear assembly of claim 13, wherein the pumping land and the bearing land of each of the washers are located in parallel planes.

15. A method of operating a gear assembly having a planet gear rotatably mounted on a pin mounted to a planet carrier, the carrier and the planet gear having opposed retainer surfaces to limit axial movement of the planet gear along an axis of the pin, the method comprising:
   placing a washer over the pin between the retainer surfaces, the washer having a first side having a pressure pocket that is recessed in an axial direction, an annular bearing land on an outer periphery of the recess that is raised relative to the pressure pocket and initially in contact with one of the retainer surfaces, an annular pumping surface on an inner periphery of the recess that is raised relative to the pressure pocket, the pumping surface defining a flow passage between the washer and said one of the retainer surfaces;
   introducing lubricant to the carrier; and
   rotating the carrier and causing the planet gear assembly to rotate about the pin axis, the rotation of the carrier creating centrifugal force to cause the lubricant to flow radially outward from the carrier through the flow passage and into the pressure pocket, creating pressure in the pressure pocket, the pressure in the pressure pocket causing the bearing land to move away from contact with said one of the retainer surfaces, the lubricant then flowing radially outward between the bearing land and said one of the retainer surfaces.

\* \* \* \* \*

UNITED STATES PATENT AND TRADEMARK OFFICE
CERTIFICATE OF CORRECTION

PATENT NO. : 6,592,490 B2
DATED : July 15, 2003
INVENTOR(S) : David L. Olson

It is certified that error appears in the above-identified patent and that said Letters Patent is hereby corrected as shown below:

Column 5,
Line 30, delete "bearing" and insert therefor -- pumping --

Signed and Sealed this

Twenty-first Day of October, 2003

JAMES E. ROGAN
*Director of the United States Patent and Trademark Office*